Dec. 28, 1948.  W. J. HALL ET AL  2,457,148
STRUCTURAL BEAM
Filed Aug. 2, 1943
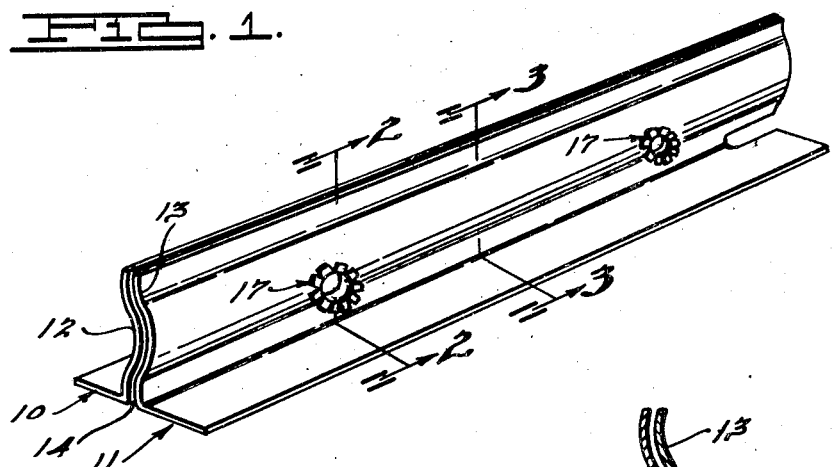
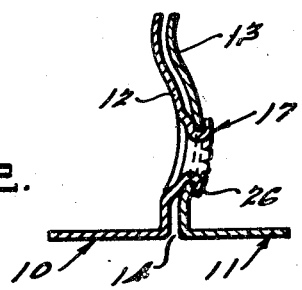
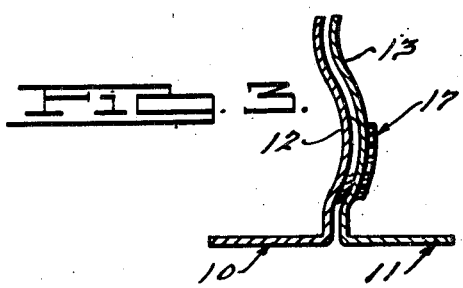
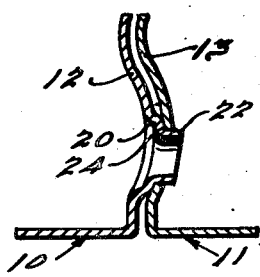
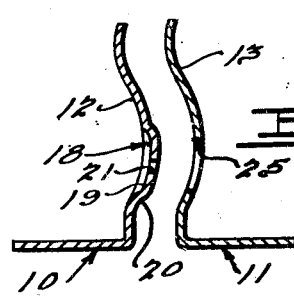
INVENTORS.
William J. Hall,
Orley J. Crowe.
BY
Harness, Dickey & Pierce Patented Dec. 28, 1948

2,457,148

UNITED STATES PATENT OFFICE 2,457,148

STRUCTURAL BEAM

William J. Hall and Orley J. Crowe, Detroit, Mich., assignors to Great Lakes Steel Corporation, a corporation of Delaware Application August 2, 1943, Serial No. 497,012

1 Claim. (Cl. 189—37)

The invention relates to building structures, and it has particular relation to a structural beam.

The use of steel beams to which sheeting or other material may be nailed is not new, and in fact at the present time beams of this general character are used in large quantities. As an example, the beams may comprise two channels having their web portions secured together in spaced relation by means of welding or riveting. Various spacing means have been used, such as a washer or other element disposed between the webs. The present invention is concerned with improvements in the fastening of the two parts of the beam together in spaced relation.

An object of the invention in general is to provide an improved means for fastening the parts of a beam together in spaced relation which results in a stronger beam and one which is less expensive to manufacture.

Another object of the invention is to provide a method of fastening the two parts of a beam together which is efficient and inexpensive, all to the end that the beam may be made more rapidly and less expensively.

Other objects of the invention will become apparent from the following specification, from the drawing relating thereto, and from the claim hereinafter set forth.

For a better understanding of the invention reference may be had to the drawing wherein:

Fig. 1 is a perspective view of a beam constructed according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is a sectional view of the two parts of the beam as seen at one stage of manufacture; and Fig. 5 is a view similar to Fig. 4, illustrating the two parts of the beam as seen prior to final clinching of the fastening means.

Referring to the several figures, the beam illustrated comprises two angle irons 10 and 11 having leg or web portions 12 and 13, respectively. These web portions are maintained in spaced relation so as to provide a slot 14 for receiving nails, and the webs are sinuously bent in order to bend the nail as it is driven into the slot. For fastening the two webs together so as to form a unitary beam, fastening means 17 are employed at spaced points, and such fastening means and the method of fastening the parts together constitute principally the subject matter of the present invention.

Referring to Figs. 4 and 5, each angle iron is formed separately, and then the web 12 of the angle iron 10 is formed with spaced bosses 18. Each of these bosses has a substantially flat or disc portion 19 spaced from the web a distance corresponding to the space to be provided between the webs 12 and 13. At the outer margin of each flat portion 19 a rim 20 is formed which joins the disc portion to the web. A small central opening 21 is formed in this portion 19 for facilitating extrusion of a tubular portion 22 as seen in Fig. 5, and it will be noted that it is formed from a portion of the disc inwardly from the outer margin of the disc so as to leave a marginal shoulder 24 next to the rim 20.

The web 13 of the angle iron 11 is formed with openings 25 corresponding in number to the bosses and projections on the angle iron 10, and each of the openings 25 substantially corresponds in size to the outer diameter of the projection 22, although the size of the opening should allow insertion of the projection thereinto without difficulty. The parts are assembled, as shown in Fig. 5, and with the shoulder 24 in contact with the web 13 around the opening 25, the outer end of the projection 22 is expanded outwardly, as shown in Figs. 1, 2, and 3, at 26 so as to clinch the web between the shoulder 24 and the expanded end of the projection. This clinching is effected forcefully so that the webs are tightly fastened together in accurately spaced relation. Furthermore, the projection 22 is sufficiently long that the clinching metal engages the web 13 sufficiently to insure a connection which will be strong and permanent.

It will be understood by those skilled in the art that the boss 18 shown in Fig. 4 may be formed by suitable tools and dies and that the opening 21 therein may be formed by suitable punch and backing element or die. Similarly, the projection 22 may be extruded from the disc portion 19 of the boss by using a suitable backing die and extruding punch for extruding the metal through the die opening. Formation of the opening 25 in the web 13 may be effected in any suitable way, such as by using a punch and die. After the parts are brought together, as shown in Fig. 5, a backing element may be used to engage the marginal shoulder 24, and then an expanding punch may be used at the opposite side of the assembly for causing the end of the projection to be expanded outwardly and clinched against the web 13.

In manufacturing beams according to the invention, two beam elements may be formed in predetermined lengths, and then a plurality of the bosses and projections may be formed on one of the angle irons, and a plurality of openings corresponding in number may be formed on the other angle iron. Then the two angle irons may be assembled with the projections 22 extending through the openings 25, and then clinching may be effected at a plurality of projections simultaneously. Presses or other suitable equipment having tools and dies may be provided for effecting these operations, as will be understood by those skilled in the art.

Although only one form of the invention has been illustrated and described in detail, it will be apparent to those skilled in the art that various modifications may be made without departing from the scope of the appended claim.

What is claimed is:

A nailing beam comprising two webs and a plurality of connecting means fastening said webs together and holding them in predetermined spaced relation for receiving and anchoring nails driven therebetween, each of the connecting means comprising metal of one web pressed outwardly toward the other web to form a boss and a tubular projecting form of web metal located inwardly from the margin of the boss to leave a marginal shoulder extending completely about the tubular projection, said tubular projection extending from the shoulder through an opening in the other web having the same size and shape as the exterior of the tubular projection in the opening, said shoulder engaging the inner surface of the other web around the opening to maintain the webs in predetermined spaced relation and said tubular projection having its outer free end expanded outwardly into clamping engagement with the other web about the opening to lock the webs together and hold said other web against said shoulder.

WILLIAM J. HALL.
ORLEY J. CROWE.

REFERENCES CITED

The following references are of record in the file of this patent:

UNITED STATES PATENTS

| Number | Name | Date |
|---|---|---|
| 930,611 | Pelton | Aug. 10, 1909 |
| 1,114,135 | Hafertep | Oct. 20, 1914 |
| 1,900,541 | Buelow et al. | Mar. 7, 1933 |
| 1,951,168 | Roth | Mar. 13, 1934 |
| 2,049,925 | Rafter | Aug. 4, 1936 |
| 2,147,965 | Clauss | Feb. 21, 1939 |
| 2,264,897 | Becker | Dec. 2, 1941 |